United States Patent
Xiao (10) Patent No.: US 11,912,173 B2
(45) Date of Patent: Feb. 27, 2024

(54) BABY CARRIER AND CANOPY LOCKING ASSEMBLY THEREOF

(71) Applicant: WONDERLAND SWITZERLAND AG, Steinhausen (CH)

(72) Inventor: Xiaohong Xiao, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 206 days.

(21) Appl. No.: 17/498,061

(22) Filed: Oct. 11, 2021

(65) Prior Publication Data
US 2022/0111775 A1 Apr. 14, 2022

(30) Foreign Application Priority Data
Oct. 12, 2020 (CN) .......................... 202022265907.4

(51) Int. Cl.
*B60N 2/28* (2006.01)
*A47D 13/02* (2006.01)

(52) U.S. Cl.
CPC .......... *B60N 2/2821* (2013.01); *A47D 13/02* (2013.01); *A47D 13/027* (2022.08); *B60N 2/2845* (2013.01)

(58) Field of Classification Search
CPC ............................ B60N 2/2845; B60N 2/2821
See application file for complete search history.

(56) References Cited

U.S. PATENT DOCUMENTS

| | | | | |
|---|---|---|---|---|
| 5,074,616 A * | 12/1991 | Smith | .................... | A47D 15/00 297/184.13 |
| 5,522,639 A * | 6/1996 | Jaime | ....................... | B60N 2/28 297/184.13 |
| 5,730,490 A * | 3/1998 | Mortenson | ........... | B60N 2/2845 297/184.13 |
| 2011/0210585 A1* | 9/2011 | Leigh | ................... | B60N 2/2845 297/184.13 |
| 2013/0292973 A1* | 11/2013 | Loaiza | ................. | A47D 13/027 297/184.12 |
| 2022/0007852 A1* | 1/2022 | Mason | ................. | B60N 2/2881 |

FOREIGN PATENT DOCUMENTS

| | | |
|---|---|---|
| CN | 111483509 A | 8/2020 |
| TW | M539288 U | 4/2017 |

OTHER PUBLICATIONS

Office Action issued in counterpart Taiwanese Application No. 111143579 dated May 31, 2023.

* cited by examiner

*Primary Examiner* — Philip F Gabler
(74) *Attorney, Agent, or Firm* — Volpe Koenig (57) ABSTRACT

The present disclosure provides a canopy locking assembly suitable to be installed on a baby carrier. The baby carrier includes a handle and a foldable canopy mechanism at least having a folded state and an unfolded state. The canopy locking assembly includes a locking member and a matching member that are separable and lockable, the locking member is installed on the canopy mechanism, the matching member is installed on the handle. The locking member moves relatively close to the matching member when the canopy mechanism is switched from the folded state to the unfolded state, and the canopy mechanism is kept in the unfolded state constantly when the locking member and the matching member are locked. The canopy locking assembly can keep the canopy mechanism unfolded constantly when in use to avoid from being folded by accident. In addition, the present disclosure further provides a baby carrier.

23 Claims, 9 Drawing Sheets

BABY CARRIER AND CANOPY LOCKING ASSEMBLY THEREOF

CROSS-REFERENCE TO RELATED APPLICATIONS

The present application is based on and claims the benefit of and priority to Chinese Patent Application No. 202022265907.4, filed on Oct. 12, 2020, the entire contents of which being incorporated herein by reference.

TECHNICAL FIELD

The present disclosure relates to the field of baby products, and more particularly, to a baby carrier and a canopy locking assembly thereof.

BACKGROUND

Strollers or child safety seats are often used by parents to carry their babies out. In order to avoid direct light or foreign substance intrusion, the stroller or child safety seat in the prior art is also provided with a foldable canopy mechanism. When the canopy mechanism is opened, the baby is protected from being disturbed by the surrounding environment to a certain extent. However, the canopy mechanism is not locked when fully opened, the canopy mechanism is easily switched from the unfolded state into the folded state when it is blew by the strong wind directly from the front or grabbed by the baby, affecting the normal use of the canopy mechanism.

Therefore, there is an urgent need for a canopy locking assembly that can keep the canopy mechanism unfolded constantly during use to overcome the above-mentioned drawbacks, and a baby carrier using the same.

SUMMARY

An objective of the present disclosure is to provide a canopy locking assembly that keeps a canopy mechanism unfolded constantly when in use.

An objective of the present disclosure is to provide a baby carrier that keeps a canopy mechanism unfolded constantly when being used.

To achieve the above-mentioned objectives, a canopy locking assembly of the present disclosure suitable to be installed on a baby carrier is provided. The baby carrier includes a handle and a foldable canopy mechanism at least having a folded state and an unfolded state.

The canopy locking assembly includes a locking member and a matching member that are separable from and lockable with each other, one of the locking member and the matching member is configured to be installed on the canopy mechanism, the other of the locking member and the matching member is configured to be installed on the handle, the locking member moves relatively close to the matching member when the canopy mechanism is switched from the folded state to the unfolded state, and the canopy mechanism is kept in the unfolded state constantly when the locking member and the matching member are locked.

Preferably, the locking member and the matching member are locked with each other by clamping.

Preferably, the locking member and the matching member are locked with each other by inserting fit.

Preferably, the locking member and the matching member are locked with each other by hanging fit.

Preferably, the locking member and the matching member are locked with each other to keep the locking member clamped with the matching member constantly.

Preferably, the matching member has an open clamping space into which the locking member extends to be clamped.

Preferably, an extending direction of an opening of the clamping space and an unfolding direction of the canopy mechanism are arranged in the same direction.

Preferably, a locking portion is provided inside the clamping space, the locking member has a matching portion that is clamped with the locking portion, and the locking member extends into the clamping space to enable the locking portion and the matching portion to be clamped.

Preferably, the matching portion has a concave structure, and the locking portion has a convex structure that may slide into the concave structure so as to be clamped.

Preferably, the clamping space has an opening end for inserting the locking member and a closed end for blocking the locking member, and the lock portion is provided at the opening end of the clamping space.

Preferably, two locking portions are arranged to directly face to each other and are provided at an opening end of the clamping space.

Preferably, the matching member further includes an assembly seat provided at the closed end of the clamping space, and an installation through hole penetrates through the assembly seat.

Preferably, an outer side surface of the assembly seat is in a curved structure directly facing the clamping space.

Preferably, an installation notch structure matching with an outer edge of the handle is provided on the matching member.

Preferably, the locking member has an open holding space into which the matching member extends to be clamped.

Preferably, the locking member is provided with two holding arms extending outwards, and the two holding arms form the holding space.

Preferably, the locking member has a U-shaped structure.

Preferably, one matching portion is provided on each of opposite side surfaces of the locking member.

Preferably, the matching portion on the locking member is arranged adjacent to the holding space.

Preferably, the locking member may be rotatably adjustably installed on the handle or the canopy mechanism.

Preferably, the locking member is installed on the handle or the canopy mechanism via a fabric, a first end of the fabric is installed at a free end of the holding arm and a second end of the fabric is installed on the handle or the canopy mechanism.

The baby carrier of the present disclosure includes a foldable canopy mechanism, a handle, a carrier body and the canopy locking assembly mentioned above, wherein the canopy mechanism is installed on the carrier body, both ends of the handle are pivotally connected to the carrier body, respectively, one of the locking member and the matching member is installed on the canopy mechanism, and the other of the locking member and the matching member is installed on the handle.

Preferably, the canopy mechanism includes a plurality of support rods and a cover, wherein the support rods are rotatably installed on the carrier body, the cover is wrapped on the support rod, one of the locking member and the matching member is installed on the cover, and the other of locking member and the matching member is installed on the handle.

Preferably, the canopy mechanism further includes an enclosure accommodated in the cover, a rear end of the enclosure is connected to the cover, and the unfolded cover and the enclosure are covered on the carrier body.

Preferably, the carrier body is a child safety seat, an infant sleeping box or a crib.

Compared with the prior art, the canopy locking assembly of the present disclosure includes a locking member and a matching member which are separable from and lockable with each other. The locking member is installed on the canopy mechanism, and the matching member is installed on the handle. The locking member moves relatively close to the matching member when the canopy mechanism is switched from the folded state to the unfolded state, and the canopy mechanism is kept in the unfolded state constantly when the locking member and the matching member are locked. In this way, the locking member and the matching member are close to each other during unfolding of the canopy mechanism, so that after the canopy mechanism is unfolded, the locking member is located near the matching member, and the locking member and the matching member can be locked conveniently, thereby realizing coherent and smooth locking after the canopy mechanism is unfolded, and facilitating to be operated by the user. Moreover, since the canopy mechanism can be locked after unfolded, that is, the canopy mechanism is kept in the unfolded state constantly when the locking member and the matching member are locked, it would not be misfolded even if being subjected to accidents or external forces, thereby providing adequate protection for the baby seating on the carrier body.

It can be understood that, the baby carrier having the canopy locking assembly of the present disclosure also has the same technical effect.

DETAILED DESCRIPTION

In order to explain the technical contents, structural features, realized purposes and effects of the present disclosure, the following detailed description will be made in combination with the embodiments and the attached drawings.

Figure 1:
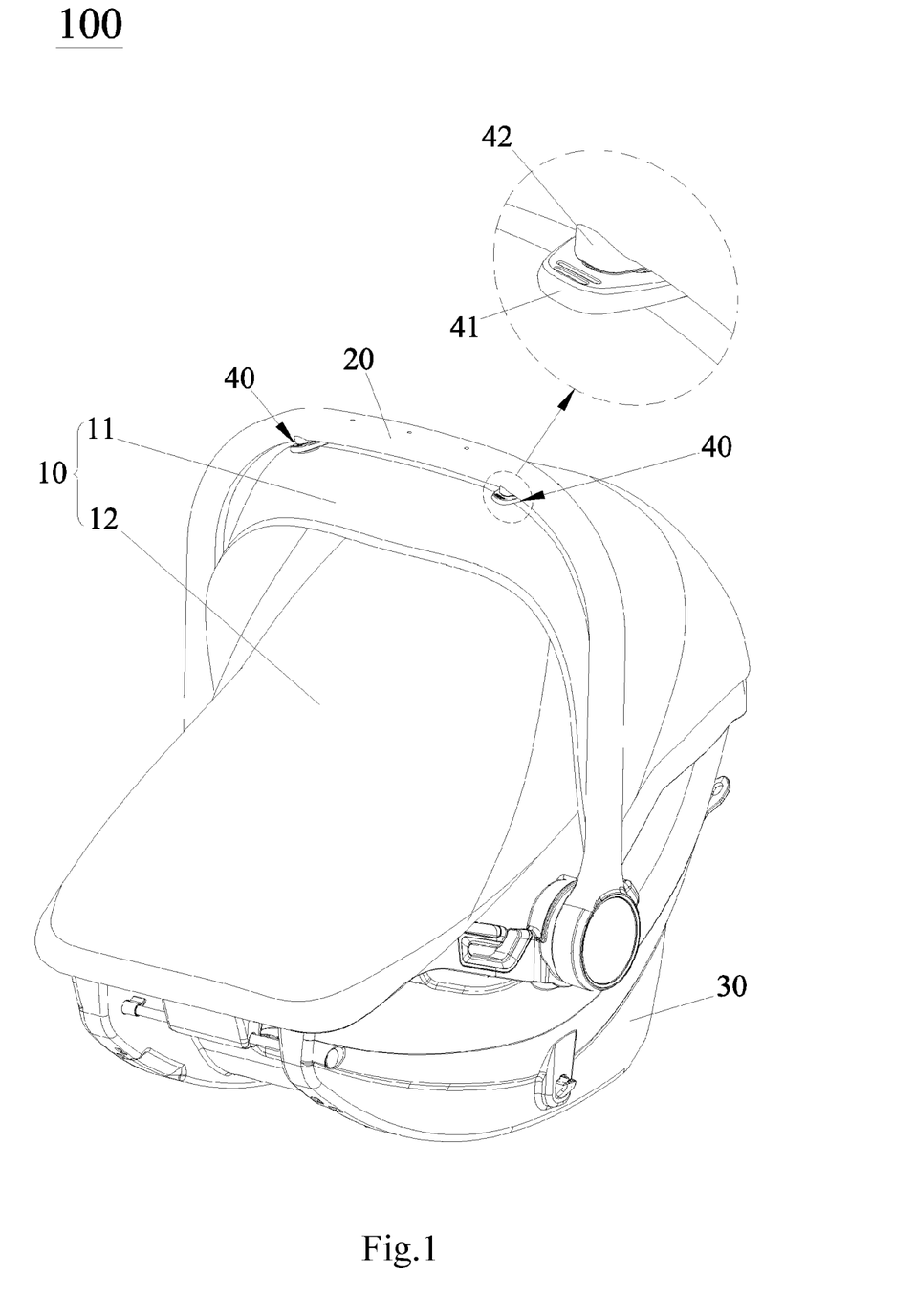
FIG. 1 is a schematic structural perspective view and a partial enlarged schematic view of a baby carrier of the present disclosure when a locking member and a matching member are locked with each other after a canopy mechanism is opened.
Figure 2:
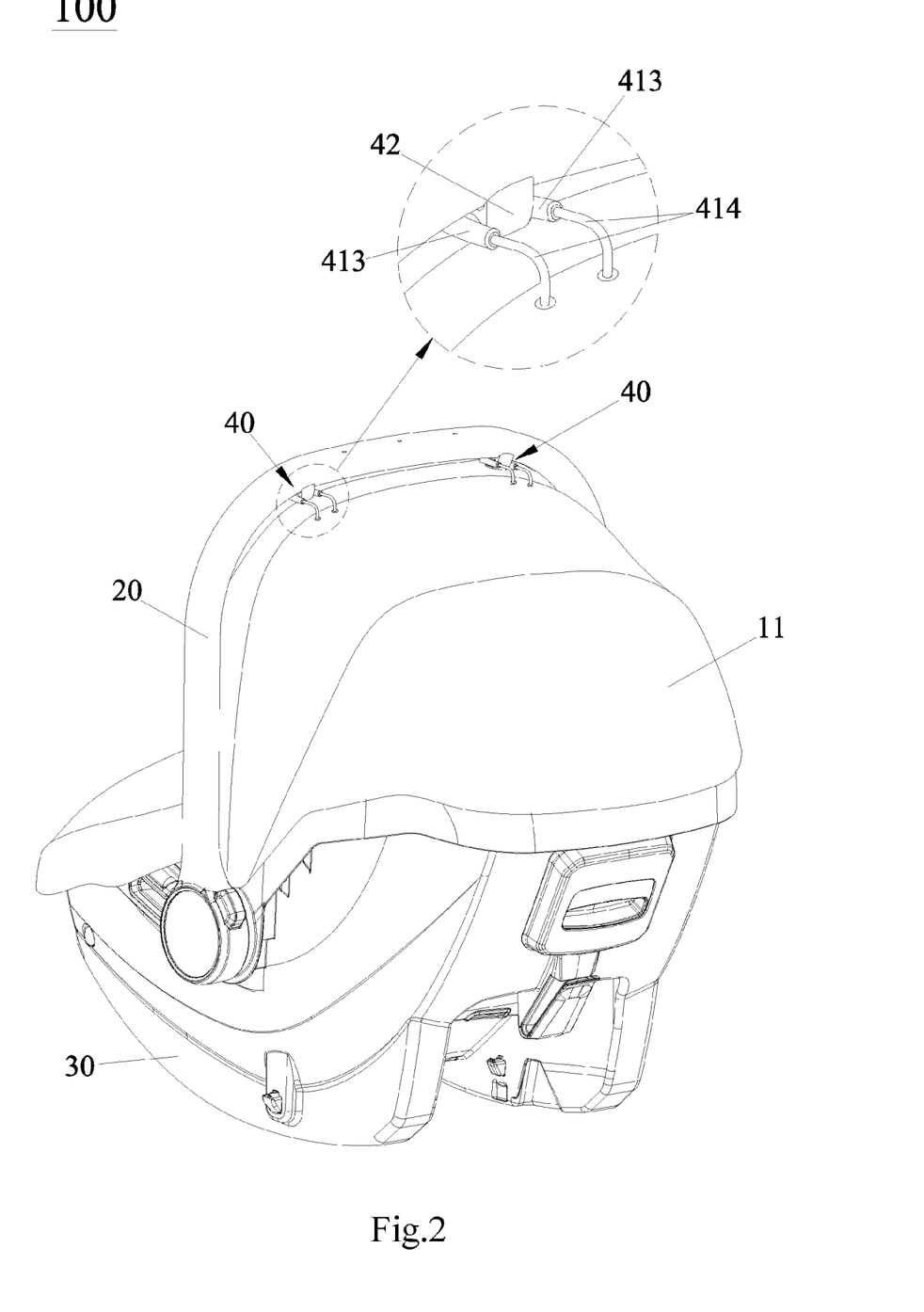
FIG. 2 is a schematic structural perspective view of the baby carrier in FIG. 1 as seen from another angle, and a partial enlarged schematic view thereof.
Figure 3:
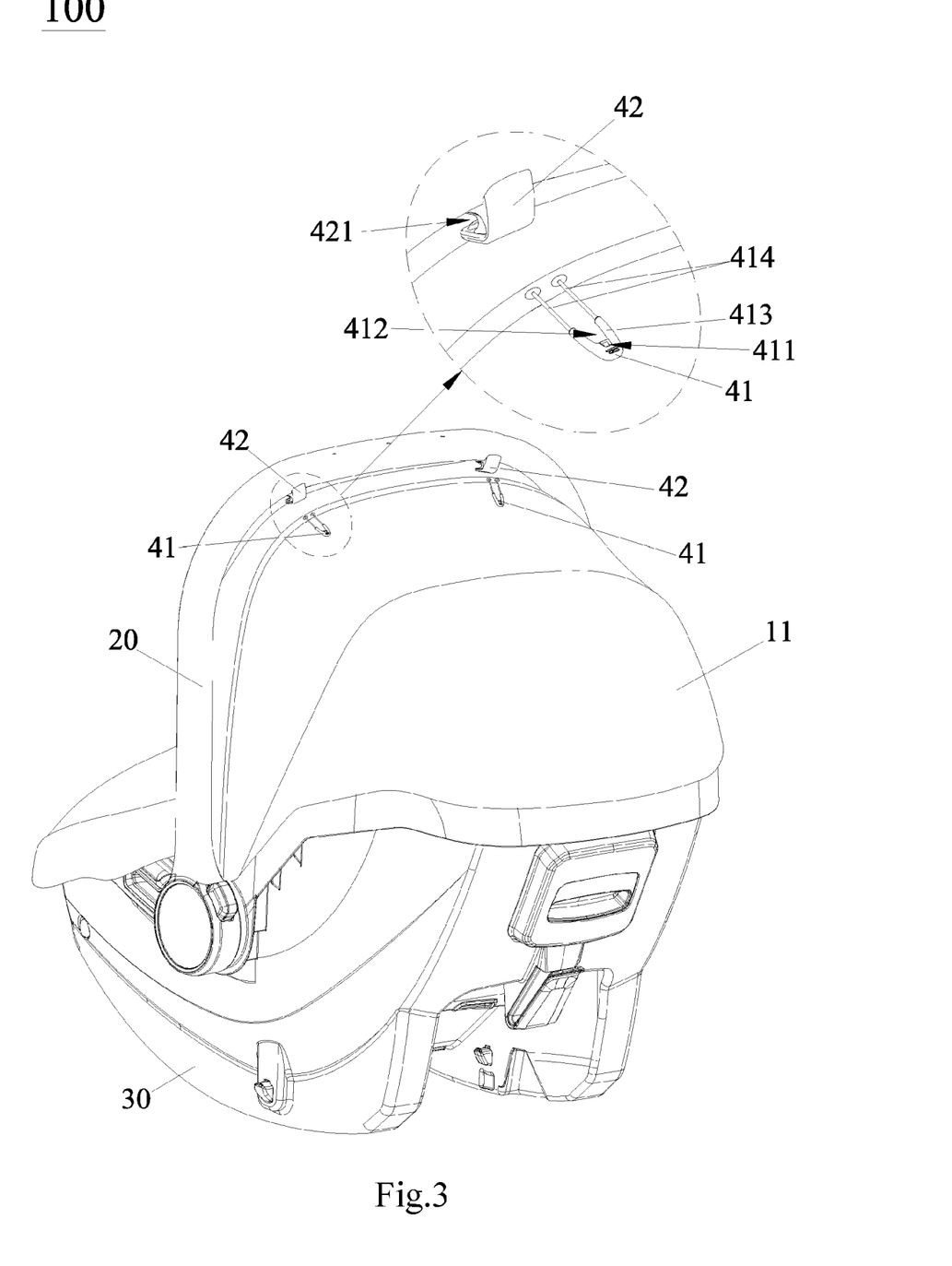
FIG. 3 is a schematic structural perspective view of the baby carrier in FIG. 2 after the locking member is separated from the matching member, and a partial enlarged schematic view thereof.
Figure 4:
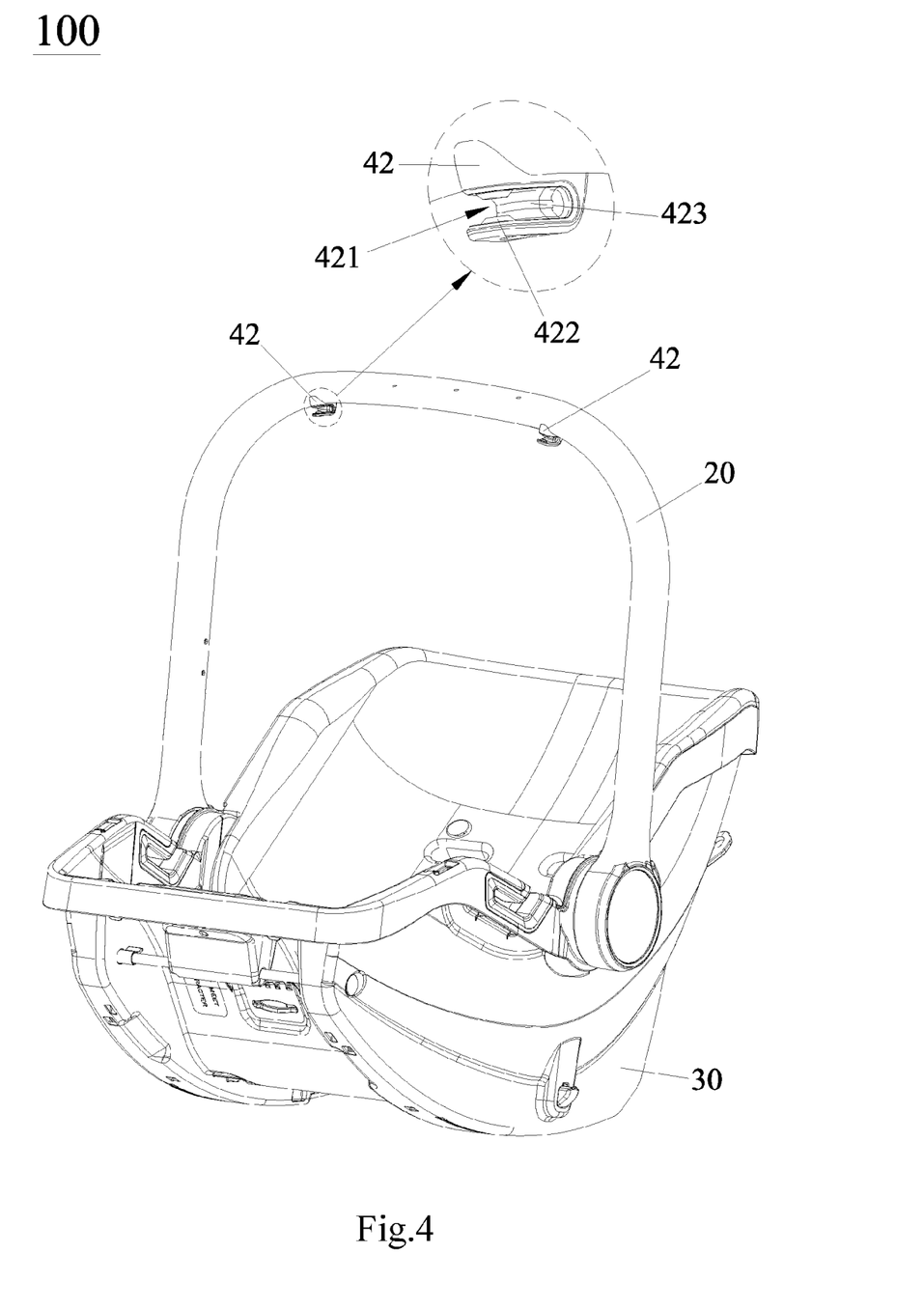
FIG. 4 is a schematic structural perspective view of the baby carrier when the canopy mechanism and the locking member thereon in FIG. 1 are hidden, and a partial enlarged schematic view thereof.
Figure 5:
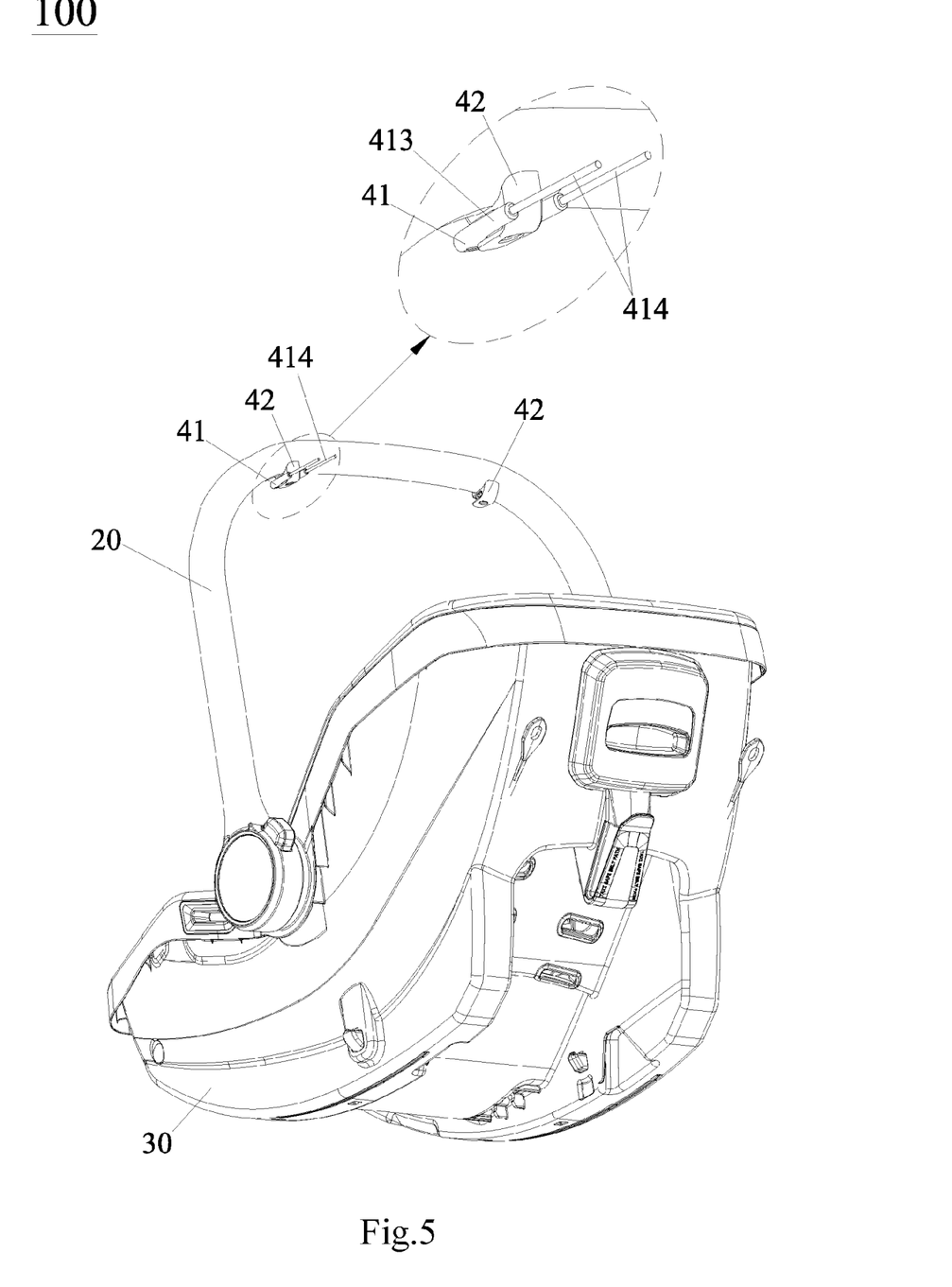
FIG. 5 is a schematic structural perspective view of the baby carrier when the canopy mechanism in FIG. 1 is hidden and a locking member and a matching member are locked with each other, and a partial enlarged schematic view thereof.
Figure 6:
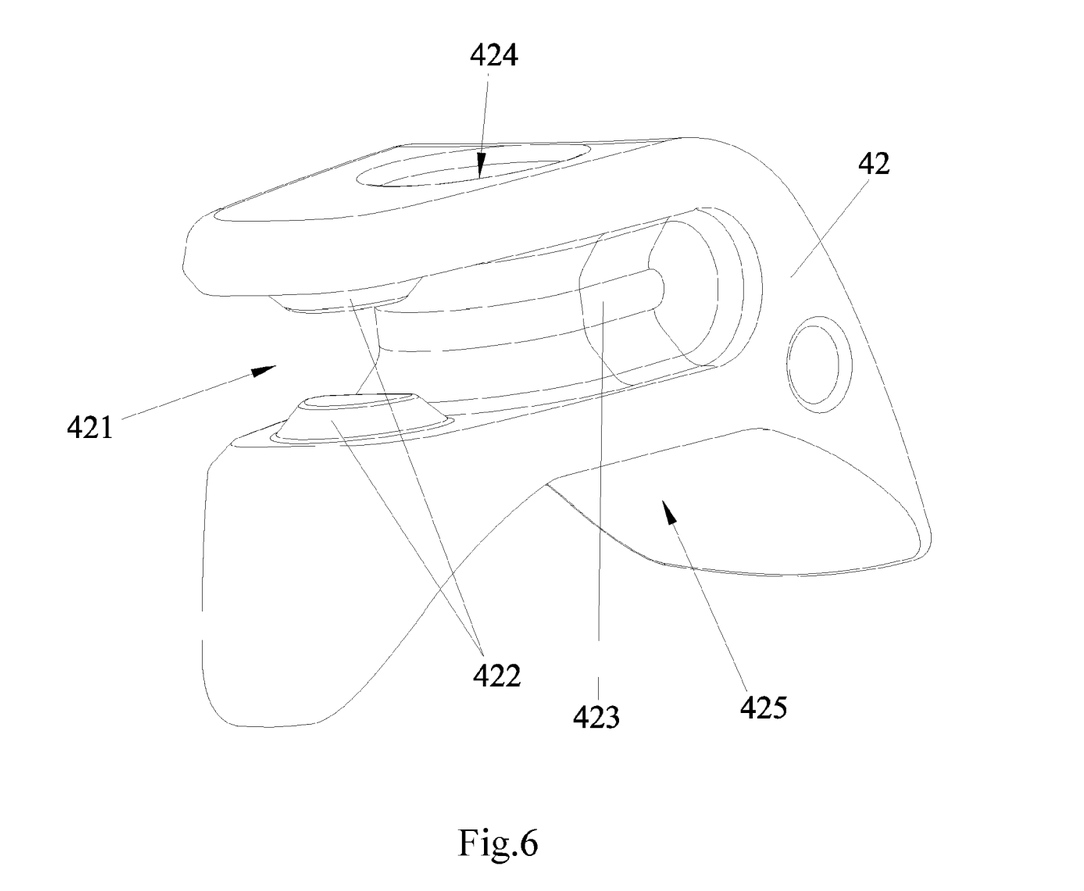
FIG. 6 is a schematic structural perspective view of the matching member in the canopy locking assembly of the present disclosure.
Figure 7:
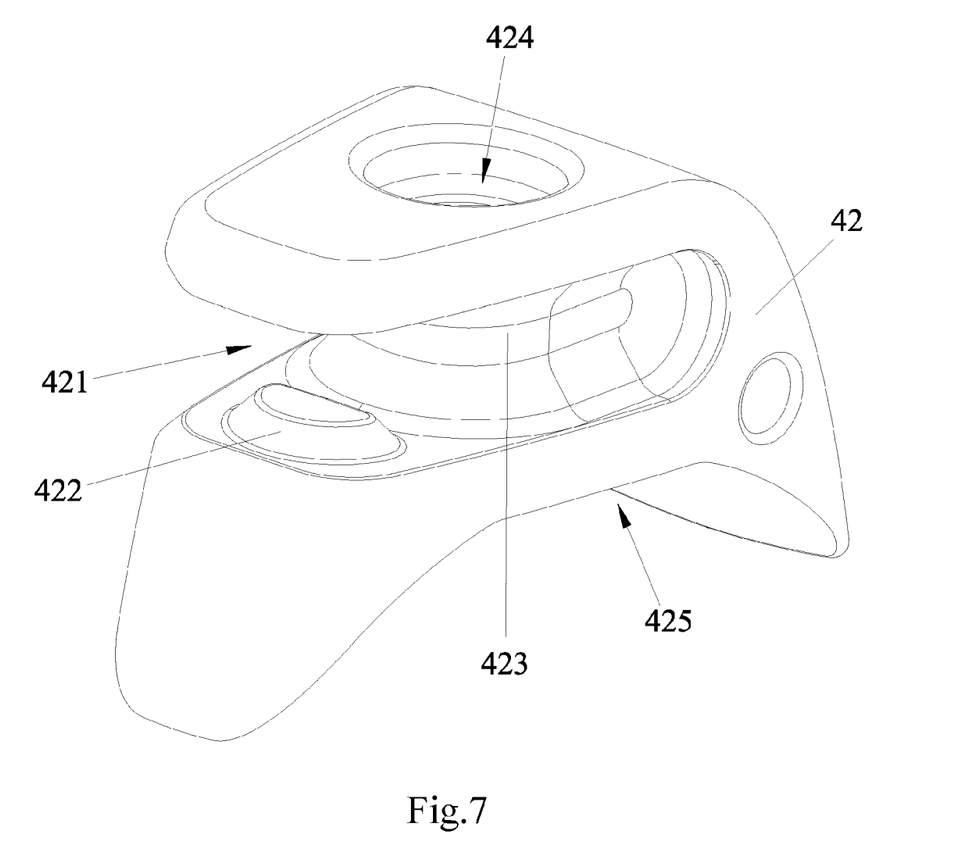
FIG. 7 is a schematic structural perspective view of the matching member in FIG. 6 as seen from another angle.
Figure 8:
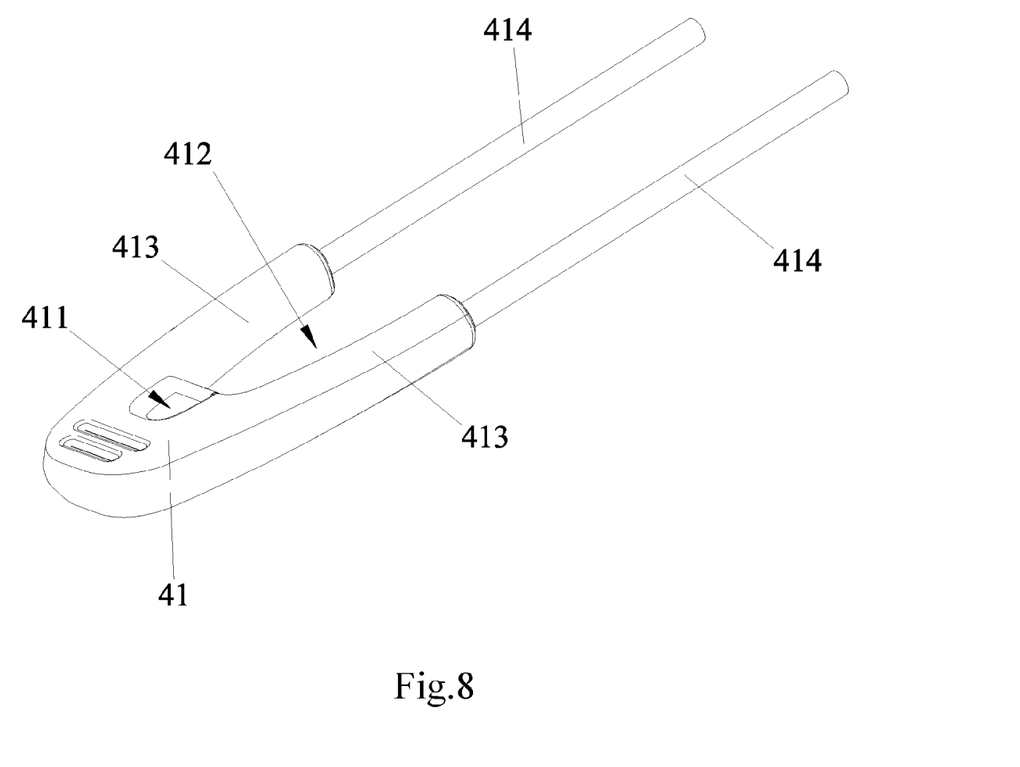
FIG. 8 is a schematic structural perspective view of the locking member in the canopy locking assembly of the present disclosure.
Figure 9:
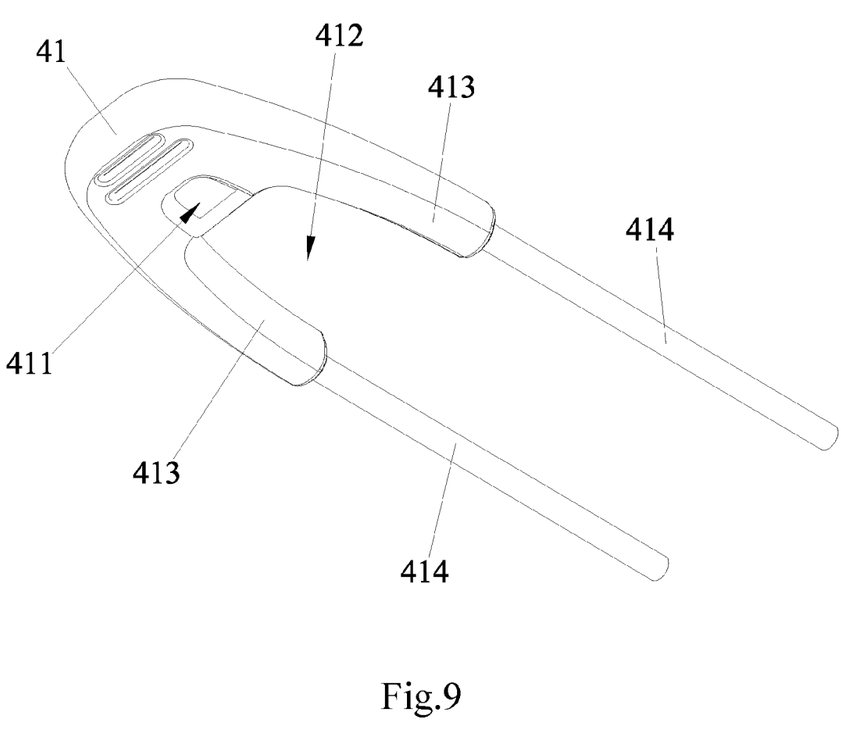
FIG. 9 is a schematic structural perspective view of the locking member in FIG. 8 as seen from another angle.

As shown in FIGS. 1 to 3, a baby carrier 100 of the present disclosure includes a foldable canopy mechanism 10, a handle 20, a carrier body 30, and a canopy locking assembly 40. The canopy mechanism 10 is installed on the carrier body 30, and both ends of the handle 20 are pivotally connected to the carrier body 30, respectively. The canopy locking assembly 40 includes a locking member 41 and a matching member 42 which are separable from each other and lockable with each other. The locking member 41 is installed on the canopy mechanism 10, and the matching member 42 is installed on the handle 20. When the canopy mechanism 10 is opened, the baby carrier 100 of the present disclosure may be covered on the carrier body 30 to provide a shielding effect for the baby seating on the carrier body 30, thereby effectively protecting the baby from being sunburned and hurt by strong light or intruded by foreign substances. In response to different usage environments, the shielding angle and the shielding area of the canopy mechanism 10 on the carrier body 30 may be adjusted by adjusting the opening range of the canopy mechanism 10, so as to facilitate taking care of the baby. When the locking member 41 and the matching member 42 are locked with each other, the canopy mechanism 10 is kept unfolded constantly to prevent the canopy mechanism 10 from being folded by accident. In other embodiments, the handle 20 may also be securely installed on the carrier body 30. By holding the handle 20, the baby carrier 100 can be easily lifted, and it is convenient for people to carry the baby to different places. For example, in the present embodiment, the carrier body 30 is a child safety seat. In other embodiments, the carrier body 30 is an appliance for carrying the baby, such as a baby sleeping box or a crib, which is not limited thereto. The carrier body 30 and the handle 20 may use the existing well-known structures, which will not be repeated herein. Further description of the canopy mechanism 10 and the canopy locking assembly 40 will be made in combination with the drawings.

As shown in FIGS. 1 to 3, the canopy mechanism 10 includes a plurality of support rods 90 (not shown) and a cover 11. The support rods are rotatably installed on the carrier body 30, and the cover 11 is wrapped on the support rods. The locking member 41 is installed on the cover 11, and the matching member 42 is installed on the handle 20. Thus, the canopy mechanism 10 has a simple structure, is easy to be arranged, and is convenient to be unfolded and folded. Preferably, the cover 11 is connected to the support rod by binding, gluing or using a locking fastener, which is not limited thereto. For example, the cover 11 may be made of fabric products of any material, which is not limited thereto. The support rod may be selected as a strip-shaped flexible member made of plastic or hardware (such as metal), which is not limited thereto. In order to protect the baby more comprehensively, the canopy mechanism 10 further includes an enclosure 12 which may be accommodated in the cover 11, a rear end of the enclosure 12 is connected to the cover 11, and the unfolded cover 11 and the enclosure 12 are covered on the carrier body 30. Under the shielding of the unfolded cover 11 and the enclosure 12, light and foreign substances cannot pass through the cover 11 and the enclosure 12, thereby creating a safe and comfortable resting environment for the baby seating on the carrier body 30. When the canopy mechanism 10 is folded, the enclosure 12 is accommodated in the cover 11, which makes full use of the inner space of the enclosure 12, making the folded canopy mechanism 10 more compact. Preferably, in the present embodiment, the enclosure 12 is a mesh shaped fabric to enhance the circulation of air inside and outside the carrier body 30. The aperture size of the enclosure 12 may be provided according to the actual situation, for example, a mosquito-resistant fabric with large aperture or a silkiness cloth with small aperture may be provided. According to actual needs, the enclosure 12 and the cover 11 may be made of the same material, which is not limited thereto. The cover 11 and the enclosure 12 may be made of dark color fabrics (such as clothes), such as gray and black fabrics, so as to improve the privacy when in use, which is not limited thereto.

As shown in FIGS. 1 to 5, the canopy locking assembly 40 of the present disclosure at least has a folded state (not shown) and an unfolded state shown in any one of FIGS. 1 to 3. The canopy locking assembly 40 includes a locking member 41 and a matching member 42 which are separable from each other and lockable with each other. The locking member 41 is installed on the canopy mechanism 10, and the matching member 42 is installed on the handle 20. The locking member 41 moves relatively close to the matching member 42 when the canopy mechanism 10 is switched from the folded state to the unfolded state, and the canopy mechanism 10 is kept in the unfolded state constantly when the locking member 41 and the matching member 42 are locked. In this way, the locking member 41 and the matching member 42 are close to each other when the canopy mechanism 10 is unfolded, so that after the canopy mechanism 10 is unfolded, the locking member 41 is located near the matching member 42, and the locking member 41 and the matching member 42 can be conveniently locked, thereby realizing coherent and smooth locking after the canopy mechanism 10 is unfolded, and facilitating to be operated by the user. Moreover, since the canopy mechanism 10 is locked after unfolded, that is, the canopy mechanism 10 is kept in the unfolded state constantly when the locking member 41 and the matching member 42 are locked, it would not be misfolded even if being subjected to accidents or external forces, thereby providing adequate protection for the baby seating on the carrier body 30. According to actual needs, in other embodiments, the locking member 41 is installed on the handle 20, and correspondingly, the matching member 42 is installed on the canopy mechanism 10, which can also realize separately locking between the locking member 41 and the matching member 42, and which is not limited thereto. Preferably, in the present embodiment, the locking member 41 is installed on the cover 11, and when the cover 11 is fully unfolded, the locking member 41 is located near the bottom of the matching member 42, so as to facilitate quick locking between the locking member 41 and the matching member 42, which is not limited thereto. In order to lock the canopy mechanism 10 more stably and comprehensively, two locking members 41 are installed on the cover 11, and correspondingly, two matching members 42 are installed on the handle 20, which is not limited thereto. The number of the locking members 41 and the matching members 42 may be increased or decreased according to the actual situation.

As shown in FIGS. 1 to 5, in the present embodiment, the locking member 41 and the matching member 42 are locked with each other by clamping, so that the connection relationship between the locking member 41 and the matching member 42 is simple and thus facilitates the operation of the user. Of course, according to actual needs, in other embodiments, the locking member 41 and the matching member 42 are locked with each other by inserting fit. For example, the matching member 42 is provided with an insertion hole (not shown) for inserting the locking member 41, and the locking member 41 is inserted into the insertion hole to realize the locking of the locking member 41 and the matching member 42. Or alternatively, the locking member 41 and the matching member 42 may also be locked with each other by hanging fit. At this time, the locking member 41 and the matching member 42 are arranged one above the other, so that the canopy mechanism 10 is hung on the handle 20, which also realize locking of the canopy mechanism 10. Or alternatively, the locking member 41 and the matching member 42 are connected through a hook-and-loop fastener (such as a Velcro), a snap-fastener, a button, or the like, which is not limited thereto.

As shown in FIGS. 4 to 9, the locking member 41 and the matching member 42 are locked with each other, so that the locking member 41 is clamped with the matching member 42 constantly. In this way, the locking member 41 and the matching member 42 are locked together after being clamped, so that the locking member 41 is stably clamped with the matching member 42, preventing the locking member 41 from being pulled off and ensuring the stability of use. The matching member 42 has an open clamping space 421, and the locking member 41 extends into the clamping space 421 so as to be clamped, thereby facilitating quick clamping and separation between the locking member 41 and the matching member 42. For example, in the present embodiment, the clamping space 421 is arranged in a U shape. According to actual needs, in other embodiments, the clamping space 421 is arranged in a V shape, which is not limited thereto. However, it should be noted that, the clamping space 421 is arranged in an open way, that is to say, the clamping space 421 may communicate with outside at least in two directions. Specifically, the extending direction of the opening of the clamping space 421 is arranged in the same direction as the unfolded direction of the canopy mechanism 10. Such arrangement facilitates the quick clamping between the locking member 41 and the matching member 42, and also effectively prevents the canopy mechanism 10 from being accidentally pushed by accident and separating the locking member 41 from the matching member 42, effectively ensuring the safety of use. More specifically, a locking portion 422 is provided inside the locking space 421, is the locking member 41 has a matching portion 411 that is clamped with the locking portion 422, and the locking member 41 extends into the locking space 42 to enable the locking portion 422 and the matching portion 411 to be clamped to each other. After the locking portion 422 and the matching portion 411 are clamped, the locking member 41 and the matching member 42 are locked with each other, and the locking member 41 and the matching member 42 are clamped together more stably and firmly to prevent being easily pulled off. For example, the matching portion 411 has a concave structure, and the locking portion 422 has a convex structure that may slide into the concave structure so as to be clamped, which is not limited thereto. According to actual needs, the matching portion 411 is provided as the convex structure, and the locking portion 422 is provided as the concave structure, realizing the clamping between the locking portion 422 and the matching portion 411.

As shown in FIGS. 4 to 9, the clamping space 421 has an open end for inserting the locking member 41 and a closed end blocking the locking member 41, and the locking portion 422 is provided at the open end of the clamping space 421. Thus, when the locking member 41 sufficiently extends into the clamping space 421, the locking portion 422 is clamped with the matching portion 411, ensuring that the locking member 41 and the matching member 42 are reliably clamped together. Preferably, two locking portions 422 are arranged to directly face to each other and are provided at the opening end of the clamping space 421, so that the locking member 41 clamped with the matching member 42 is clamped by the two locking portions 422, thereby keep clamping with the matching member 42 more stably. In order to facilitate the clamping between the locking portion 422 and the matching portion 411, one matching portion 411 is provided on each of opposite side surfaces of the locking member 41. Preferably, the two matching portions 411 are provided on the top surface and the bottom surface of the locking member 41, respectively, which is not limited thereto. Specifically, the matching member 42 further includes an assembly seat 423 provided at the closed end of the clamping space 421, and an installation through hole 424 penetrates through the assembly seat 423. The locking member 41 may be blocked from continuing to extend into the clamping space 42 by using the assembly seat 423, so that the locking member 41 is clamped at an appropriate position on the matching member 42, thereby facilitating the separation between the locking member 41 and the matching member 42. Moreover, the assembly seat 423 also enhances the structural stability of the matching member 42, and the assembly seat 423 may be conveniently installed on the handle 20 by providing a locking fastener (such as a screw, which is not limited to thereto) penetrating through the installation through hole 424. In order to enable the locking member 41 and the matching member 42 to be tightly connected after being clamped, the outer side surface of the assembly seat 423 is a curved structure directly facing the clamping space 421. More specifically, an installation notch structure 425 matching the outer edge of the handle 20 is provided on the matching member 42, and the matching member 42 is more tightly installed on the handle 20 by using the installation notch structure 425. Preferably, the installation notch structure 425 is provided on the top surface of the matching member 42, which is not limited thereto. In the present embodiment, the outer edge of the handle 20 has a curved surface structure, and the installation notch structure 425 is arranged in an arc shaped curved surface structure, which is not limited thereto.

As shown in FIGS. 4 to 9, the locking member 41 has an open holding space 412, and the matching member 42 extends into the holding space 412 to be clamped. When the locking member 41 and the matching member 42 are clamped, the locking member 41 extends into the clamping space 421, and the matching member 42 extends into the holding space 412, so that the locking member 41 and the matching member 42 can be clamped more deeply, and the locking member 41 and the matching member 42 after clamped are mutually restrained without offsetting, and thus the locking member 41 and the matching member 42 are more stably clamped together. For example, the locking member 41 has a flat structure (which is not limited thereto), so that the structure of the locking member 41 and the matching member 42 after clamped is more compact. Specifically, the locking member 41 is provided with two holding arms 413 extending outwards, and the two holding arms 413 form the holding space 412 by enclosing. In this way, the structure of the locking member 41 is simple and light. For example, the locking member 41 has a U-shaped structure, which is not limited thereto. More specifically, the matching portion 411 on the locking member 41 is arranged adjacent to the holding space 412, so that after the locking member 41 and the matching member 42 are clamped, the locking portion 422 can be quickly clamped with the matching portion 411.

As shown in FIGS. 2, 3, 5, 8 and 9, the locking member 41 is rotatably adjustably installed on the canopy mechanism 10 so as to facilitate adjusting the locking member 41, so that the locking member 41 can be aligned with and clamped into the clamping space 421 of the matching member 42. Preferably, the rotation direction of the locking member 41 at least includes a direction towards the unfolding direction of the canopy mechanism 10 and a direction towards the folding direction of the canopy mechanism 10. Specifically, the locking member 41 is installed on the canopy mechanism 10 via a fabric 414, the first end of the fabric 414 is installed at the free end of the holding arm 413, and the second end of the fabric 414 is installed on the canopy mechanism 10. At this time, the locking member 41 can be greatly rotatably adjusted on the top of the canopy mechanism 10 so as to facilitate the locking member 41 to be aligned with and inserted into the clamping space 421 of the matching member 42. Preferably, in the present embodiment, the second end of the fabric 414 is sewn on the cover 11. According to actual needs, in other embodiments, the second end of the fabric 414 is fixed to the cover 11 by glue melting, thereby realizing the fixing between the fabric 414 and the cover 11, which is not limited thereto. For example, the fabric 414 may be made of elastic material to facilitate adjusting the relative distance of the locking member 41 to the matching member 42, which is not limited thereto.

The working principle of the baby carrier 100 of the present disclosure will be described below in combination with the FIGS. 1 to 9. When it is required to use the canopy mechanism 10, each of support rods is rotated to drive the cover 11 to be unfolded. During the unfolding of the cover 11, the locking member 41 moves close to the matching member 42 following the unfolding of the cover 11. After the cover 11 is fully unfolded, the locking member 41 is located near the bottom of the matching member 42, the locking member 41 extends into the clamping space 421 of the matching member 42, the matching member 42 correspondingly extends into the holding space 412 of the locking member 41, and the locking member 41 and the matching member 42 are clamped together. After the locking member 41 and the matching member 42 are clamped with each other, the locking portion 422 on the matching member 42 is then clamped in the matching portion 411 of the locking member 41, so that the locking member 41 and the matching member 42 are locked with each other, and thus the locking member 41 is clamped with the matching member 42 constantly. At this time, the canopy mechanism 10 is kept in the unfolded state constantly, and the canopy mechanism 10 is not easily folded by accidents or external forces, and provides adequate protection for baby seating on the carrier body 30. According to actual needs, the enclosure 12 may be further opened, so that the enclosure 12 and the cover 11 are jointly covered on the carrier body 30 to provide more adequate protection for baby seating on the carrier body 30.

When folding the canopy mechanism 10, the enclosure 12 is accommodated in the cover 11. The locking member 41 is pulled out from the matching member 42, and the locking portion 422 runs out of the matching portion 411. After the locking member 41 is separated from the matching member 42, each of the support rods is rotated to drive the cover 11 to be folded, and the folding of the canopy mechanism 10 is finally completed.

Compared with the prior art, the canopy locking assembly 40 of the present disclosure includes a locking member 41 and a matching member 42 which are separable from and lockable with each other. The locking member 41 is installed on the canopy mechanism 10, and the matching member 42 is installed on the handle 20. The locking member 41 moves relatively close to the matching member 42 when the canopy mechanism 10 is switched from the folded state to the unfolded state, and the canopy mechanism 10 is kept in the unfolded state constantly when the locking member 41 and the matching member 42 are locked. In this way, the locking member 41 and the matching member 42 are close to each other during unfolding of the canopy mechanism 10, so that after the canopy mechanism 10 is unfolded, the locking member 41 is located near the matching member 42, and the locking member 41 and the matching member 42 can be locked conveniently, thereby realizing coherent and smooth locking after the canopy mechanism 10 is unfolded, and facilitating to be operated by the user. Moreover, since the canopy mechanism 10 can be locked after unfolded, that is, the canopy mechanism 10 is kept in the unfolded state constantly when the locking member 41 and the matching member 42 are locked, it would not be misfolded even if being subjected to accidents or external forces, thereby providing adequate protection for the baby seating on the carrier body 30.

It can be understood that, the baby carrier 100 having the canopy locking assembly 40 of the present disclosure also has the same technical effect.

The above disclosure is only the preferred embodiments of the present disclosure. Of course, the scope of the present disclosure cannot be limited by the above disclosure. Therefore, the equivalent changes made according to the scope of the present disclosure still fall within the scope of the present disclosure.

What is claimed is:

1. A canopy locking assembly suitable to be installed on a baby carrier, wherein the baby carrier comprises a handle and a foldable canopy mechanism at least having a folded state and an unfolded state, the canopy locking assembly comprising:
    a locking member and a matching member that are separable from and lockable with each other, one of the locking member and the matching member is configured to be installed on the foldable canopy mechanism, the other of the locking member and the matching member is configured to be installed on the handle, the locking member moves relatively close to the matching member when the foldable canopy mechanism is switched from the folded state to the unfolded state, and the foldable canopy mechanism is kept in the unfolded state constantly when the locking member and the matching member are locked, wherein
    the matching member has an open clamping space, the open clamping space has an opening end for inserting the locking member and a closed end for blocking the locking member, and the opening end is located in front of the closed end in an unfolding direction of the canopy mechanism.

2. The canopy locking assembly according to claim 1, wherein the locking member and the matching member are locked with each other by clamping.

3. The canopy locking assembly according to claim 1, wherein the locking member and the matching member are locked with each other by inserting fit.

4. The canopy locking assembly according to claim 1, wherein the locking member and the matching member are locked to keep the locking member clamped with the matching member constantly.

5. The canopy locking assembly according to claim 1, wherein an extending direction of the opening end of the open clamping space and an unfolding direction of the foldable canopy mechanism are arranged in the same direction.

6. The canopy locking assembly according to claim 1, wherein a locking portion is provided inside the open clamping space, the locking member has a matching portion that is clamped with the locking portion, and the locking member extends into the open clamping space to enable the locking portion and the matching portion to be clamped.

7. The canopy locking assembly according to claim 6, wherein the matching portion has a concave structure, and the locking portion has a convex structure sliding into the concave structure to be clamped.

8. The canopy locking assembly according to claim 6, wherein the locking portion is provided at the opening end of the open clamping space.

9. The canopy locking assembly according to claim 8, wherein the matching member further comprises an assembly seat provided at the closed end of the open clamping space, and an installation through hole penetrates through the assembly seat.

10. The canopy locking assembly according to claim 9, wherein an outer side surface of the assembly seat is in a curved structure directly facing the open clamping space.

11. The canopy locking assembly according to claim 6, wherein two locking portions are arranged to directly face to each other and are provided at the opening end of the open clamping space.

12. The canopy locking assembly according to claim 6, wherein the locking member has an open holding space into which the matching member extends to be clamped.

13. The canopy locking assembly according to claim 12, wherein the locking member is provided with two holding arms extending outwards, and the two holding arms form the open holding space.

14. The canopy locking assembly according to the claim 13, wherein the locking member is installed on the handle or the foldable canopy mechanism via a fabric, a first end of the fabric being installed at a free end of the holding arm and a second end of the fabric being installed on the handle or the foldable canopy mechanism.

15. The canopy locking assembly according to claim 12, wherein the matching portion on the locking member is arranged adjacent to the open holding space.

16. The canopy locking assembly according to claim 6, wherein one matching portion is provided on each of opposite side surfaces of the locking member.

17. The canopy locking assembly according to claim 1, wherein an installation notch structure matching with an outer edge of the handle is provided on the matching member.

18. The canopy locking assembly according to claim 1, wherein the locking member has a U-shaped structure.

19. The canopy locking assembly according to claim 1, wherein the locking member is rotatably adjustably installed on the handle or the foldable canopy mechanism.

20. A baby carrier comprising a foldable canopy mechanism, a handle, a carrier body and a canopy locking assembly, wherein the foldable canopy mechanism is installed on the carrier body, and both ends of the handle are pivotally connected to the carrier body, respectively, and
    wherein the canopy locking assembly is installed on the baby carrier, wherein the foldable canopy mechanism at least having a folded state and a unfolded state, the canopy locking assembly comprises a locking member and a matching member that are separable from and lockable with each other, one of the locking member and the matching member is configured to be installed on the foldable canopy mechanism, the other of the locking member and the matching member is configured to be installed on the handle, the locking member moves relatively close to the matching member when the foldable canopy mechanism is switched from the folded state to the unfolded state, and the foldable canopy mechanism is kept in the unfolded state constantly when the locking member and the matching member are locked, wherein the matching member has an open clamping space, the open clamping space has an opening end for inserting the locking member and a closed end for blocking the locking member, and the opening end is located in front of the closed end in an unfolding direction of the canopy mechanism.

21. The baby carrier according to claim 20, wherein the foldable canopy mechanism comprises a plurality of support rods and a cover, the support rods are rotatably installed on the carrier body, the cover is wrapped on the support rods, one of the locking member and the matching member is installed on the cover, and the other of locking member and the matching member is installed on the handle.

22. The baby carrier according to claim 21, wherein the foldable canopy mechanism further comprises an enclosure accommodated in the cover, a rear end of the enclosure is connected to the cover, and the unfolded cover and the enclosure are covered on the carrier body.

23. The baby carrier according to claim 20, wherein the carrier body is a child safety seat, an infant sleeping box or a crib.

* * * * *